(12) United States Patent
Enokida

(10) Patent No.: US 6,668,086 B1
(45) Date of Patent: Dec. 23, 2003

(54) TILE-BASED IMAGE DATA DECODING METHOD AND APPARATUS

(75) Inventor: Miyuki Enokida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/570,819

(22) Filed: May 15, 2000

(30) Foreign Application Priority Data

May 18, 1999 (JP) .......................................... 11-137696

(51) Int. Cl.[7] .............................. G06K 9/36; G06K 9/46
(52) U.S. Cl. ...................................... 382/233; 382/239
(58) Field of Search ................................ 382/233, 239, 382/244, 251, 240, 250, 232, 305, 302, 246; 348/222.1, 231.59

(56) References Cited

U.S. PATENT DOCUMENTS

| | | | |
|---|---|---|---|
| 5,760,847 A | | 6/1998 | Enokida ...................... 348/700 |
| 5,764,807 A | * | 6/1998 | Pearlman et al. ........... 382/240 |
| 6,049,390 A | * | 4/2000 | Notredame et al. ........ 358/1.15 |
| 6,185,339 B1 | * | 2/2001 | Ozaki ......................... 382/232 |
| 6,310,647 B1 | * | 10/2001 | Parulski et al. ......... 348/231.99 |
| 6,513,118 B1 | * | 1/2003 | Iwamura ..................... 713/176 |
| 2001/0041014 A1 | * | 11/2001 | Kaneda ....................... 382/239 |
| 2002/0071615 A1 | * | 6/2002 | Kobayashi et al. ......... 382/305 |

FOREIGN PATENT DOCUMENTS

| JP | 11098020 A | * | 4/1999 | ............ H03M/7/00 |
|---|---|---|---|---|

* cited by examiner

Primary Examiner—Wenpeng Chen
(74) Attorney, Agent, or Firm—Fitzpatrick, Cella, Harper & Scinto

(57) ABSTRACT

Disclosed are a method and apparatus for decoding encoded image data that has been obtained by dividing image data into a plurality of tiles and encoding the image data on a tile-by-tile basis. JPEG encoding tables that were used in the encoding of each of the plurality of tiles are determined based upon the headers, the JPEG-encoded data of respective ones of the plurality of tiles is arranged based upon the sameness of the JPEG encoding tables, and RST marker codes are inserted between the items of JPEG-encoded data of respective tiles, thereby creating a string of encoded data. By successively decoding this created string of encoded data from the beginning thereof, JPEG decoding need not be initiated afresh for each and every tile of encoded data, thereby making high-speed decoding possible.

10 Claims, 13 Drawing Sheets

FIG. 4A

Compression description group
Compression information properties

| Property name | ID code | type |
|---|---|---|
| JPEG tables | 0x03ii0001 | VT_BLOB |
| Maximum JPEG table index | 0x03000002 | VT_UI4 |

FIG. 4B

JPEG header table

| Field name | Length | Byte(s) | Value |
|---|---|---|---|
| Start of image marker(SOI) | 2 | 0-1 | 0xFFD8 |
| Define quantization table segment marker(DQT) | 2 | 2-3 | 0xFFDB |
| Quantization table data | variable | 4-variable | variable |
| Define Huffman table segment marker(DHT) | 2 | variable | 0xFFC4 |
| Huffman table data | variable | variable | variable |
| End of image marker(EOI) | 2 | variable | 0xFFD9 |

FIG. 5A

Format and fields of a tile header

| Field name | Length | Byte(s) |
|---|---|---|
| Tile offset | 4 | 0-3 |
| Tile size | 4 | 4-7 |
| Compression type | 4 | 8-11 |
| Compression subtype | 4 | 12-15 |

FIG. 5B

Valid compression type values

| Value | Meaning |
|---|---|
| 0x0 | Uncompressed data |
| 0x1 | Single color compression |
| 0x2 | JPEG |
| 0xffffffff | Invalid tile |

FIG. 5C

Format and entries of the compression subtype field for JPEG compressed tiles

| Field name | Length | Byte(s) |
|---|---|---|
| Interleave type | 1 | 0 |
| Chroma subsampling | 1 | 1 |
| Internal color conversion | 1 | 2 |
| JPEG tables selector | 1 | 3 |

FIG. 6

Format and entries of a JPEG abbreviated format stream for tile data

| Field name | Length | Byte(s) | Value |
|---|---|---|---|
| Start of image marker(SOI) | 2 | 0-1 | 0xFFD8 |
| Start of frame marker(SOF) | 2 | 2-3 | 0xFFC0 |
| Frame header | variable | 4-variable | variable |
| Start of scan marker(SOS)0 | 2 | variable | 0xFFDA |
| Scan header 0 | variable | variable | variable |
| Entropy coded data 0 | variable | variable | variable |
| ... | | | |
| Start of scan marker(SOS) *last* | 2 | variable | 0xFFDA |
| Scan header last | variable | variable | variable |
| Entropy coded data *last* | variable | variable | variable |
| End of image marker(EOI) | 2 | variable | 0xFFD9 |

700

701

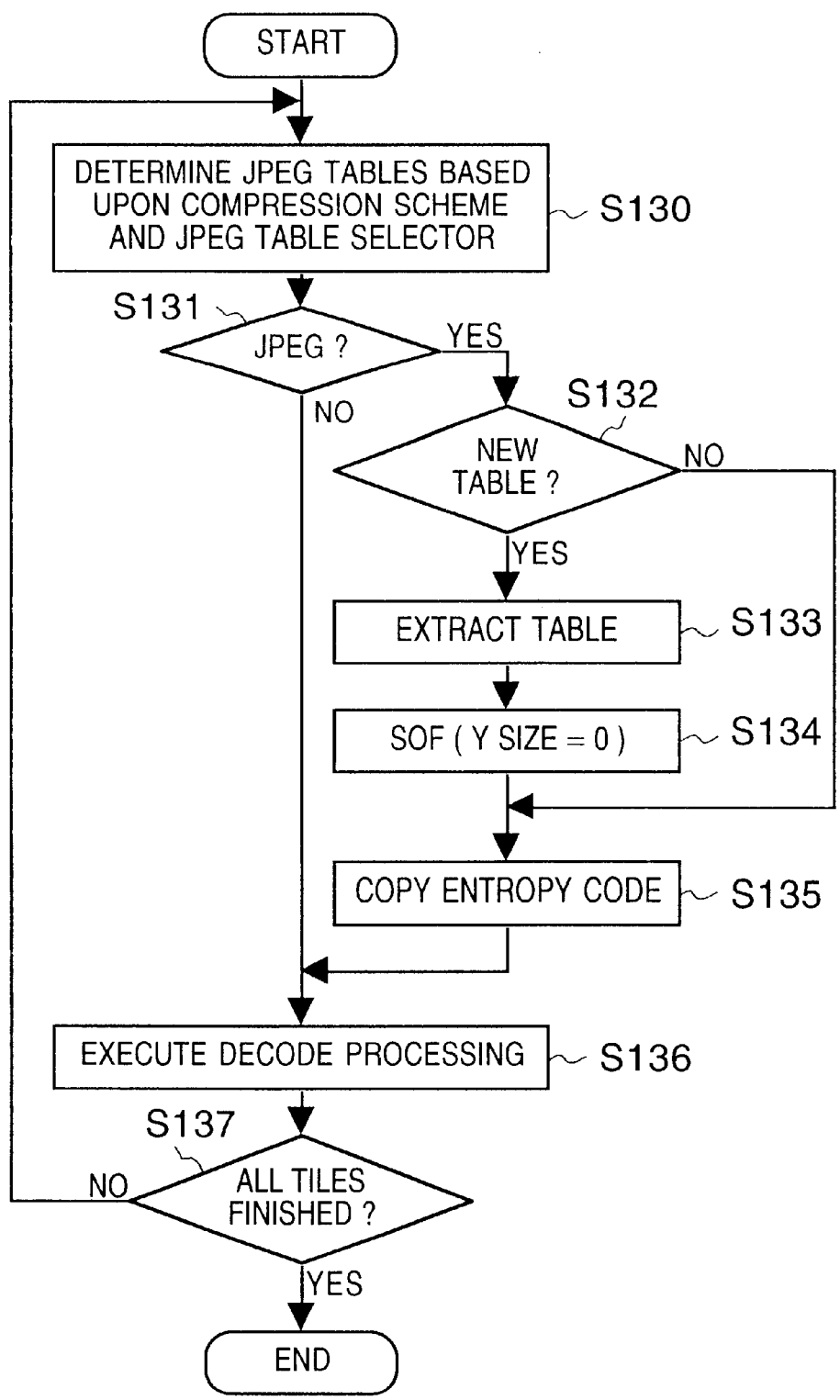

TILE-BASED IMAGE DATA DECODING METHOD AND APPARATUS

FIELD OF THE INVENTION

This invention relates to an image data decoding method and apparatus for decoding encoded image data obtained by dividing image data into a predetermined number of blocks and then encoding the data block by block.

BACKGROUND OF THE INVENTION

Conventionally, image data representing a single image is divided into a plurality of tiles each consisting of N×M pixels, an encoding scheme is decided for each tile and the image data is stored as a hierarchy of multiple resolutions. The FlashPix file is a known example of such an image data format. In the case of a FlashPix file, the images of the respective hierarchical layers of resolution are all divided into tiles of 64×64 pixels. In a case where image data having a certain resolution (here the number of pixels) is encoded in accordance with the JPEG standard, image data having this resolution, i.e., all tiles constructing the image data having this resolution, is encoded usually using the same quantization table and the same Huffman table. In such case the JPEG code of each tile does not possess information concerning the quantization and Huffman tables that were used in the encoding; this information is preserved in table form in an area separate from the tile data. Accordingly, the code of each tile is composed of information for identifying which table was used and additional JPEG code.

When a JPEG code that has been preserved in this format is decoded, table data for identifying the table and the code of each tile are merged tile by tile to create a single item of encoded data and either JPEG decoding processing is executed tile by tile or JPEG decoding processing specific to the format of each tile is executed.

In the example of the prior art described above, decoding processing is executed after the merging of the table data and encoded data of each tile to create one JPEG code for each tile. As a consequence, the processing for merging the encoded data takes time and processing such as initialization of the quantization and Huffman tables in JPEG decoding processing must be executed for all tiles. Thus, processing takes a long period of time. Furthermore, it is not easy to execute JPEG decoding processing exclusively for the data format of FlashPix files.

SUMMARY OF THE INVENTION

Accordingly, an object of the present invention is to provide an image data decoding method and apparatus for the high-speed decoding of image data that has been encoded and stored in a file format such as the FlashPix file format.

Another object of the present invention is to provide an image data decoding method and apparatus in which encoded data, which has been obtained by dividing an image into a plurality of blocks and encoding the image on a per-block basis, is arranged taking into consideration the consistency of encoding tables that were used in the encoding, and the encoded data so arranged is decoded, whereby it is possible to eliminate needless initiation of decoding processing afresh for each and every block.

According to the present invention, the foregoing object is attained by providing a decoding apparatus for decoding encoded image data that has been obtained by dividing image data into a plurality of blocks and encoding the image data on a block-by-block basis, comprising: determination means for determining encoding tables that were used in the encoding of each of the plurality of blocks; arranging means for arranging the encoded data of each of the plurality of blocks based upon sameness of the encoding tables determined by the determination means; and decoding means for successively decoding the encoded data arranged by the arranging means.

Further, according to the present invention, the foregoing object is attained by providing a decoding method for decoding encoded image data that has been obtained by dividing image data into a plurality of blocks and encoding the image data on a block-by-block basis, comprising: a determination step of determining encoding tables that were used in the encoding of each of the plurality of blocks; an arranging step of arranging encoded data of each of the plurality of blocks based upon sameness of the encoding tables determined at the determination step; and a decoding step of successively decoding the encoded data arranged at the arranging step.

It is preferred that the encoded data of each block be data encoded in accordance with the JPEG standard.

Furthermore, it is preferred that control codes be inserted at boundaries of the arranged encoded data of each of the plurality of blocks and that the control codes be restart (RST) marker codes, by way of example.

Further, when the codes are arranged, codes of blocks that have not been encoded in accordance with the JPEG standard are excluded.

Further, it is preferred that the image data be stored as a file in the FlashPix format.

Furthermore, the encoding tables include at least a quantization table and a Huffman table.

Further, when there is a code for which a new encoding table has been used, the code is arranged to follow information specifying this encoding table.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIGS. 4A and 4B are diagrams useful in describing information that has been stored in an image-content property set of a FlashPix file according to this embodiment;

FIGS. 5A through 5C are diagrams useful in describing information that has been stored in a subimage header of a FlashPix file according to this embodiment;

FIG. 6 is a diagram useful in describing JPEG-encoded data that has been stored in an image-content property set of a FlashPix file according to this embodiment;

FIG. 13 is a flowchart illustrating decoding processing according to the third embodiment of the present invention.

DESCRIPTION OF THE PREFERRED EMBODIMENTS

The characterizing features of the present invention will be set forth before describing preferred embodiment of the invention.

In a case where decoding processing is applied to a FlashPix file obtained by encoding all tiles of image data of a certain resolution in accordance with the JPEG standard and storing quantization and Huffman tables, which were used in the encoding, in an area separate from the encoded data, it is determined which quantization tables and Huffman tables were used in encoding each of the tiles, the JPEG-encoded data is merged with the table, the image size and field of the SOF (start of frame) marker code of this JPEG-encoded data are changed and a DRI (Define Restart Interval)/RST marker code is inserted. JPEG decoding processing means is provided for decoding the encoded data thus converted. The JPEG decoding processing means converts this JPEG-encoded data, which is independent from tile to tile, to JPEG-encoded data the number of items whereof corresponds to the number of tables used and number of items of encoded data, wherein:

size in horizontal direction =X size (i.e., 64) of tile;
  size in vertical direction =Y size of tile×number of tiles (i.e., 64×number of tiles);
  restart decoding processing tile by tile; and decodes this JPEG-encoded data tile by tile by decoding processing in accordance with the JPEG standard.

Furthermore, this JPEG decoding processing is ordinary JPEG decoding processing and is not JPEG decoding processing exclusively for decoding FlashPix-format files.

For example, all tiles of a certain resolution may not have been encoded by the above-described JPEG encoding method. Tiles may include some tiles that have been encoded by another encoding scheme, i.e., tiles involving single-color compression, or tiles of uncompressed data, etc.

Preferred embodiments of the present invention will now be described in detail with reference to the accompanying drawings.

Figure 1:
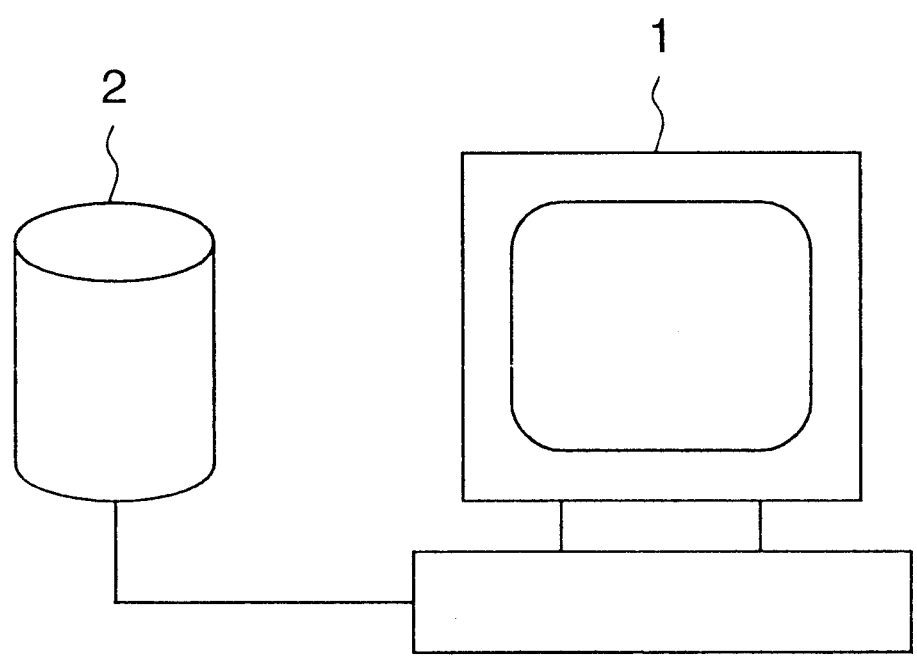
FIG. 1 is a diagram showing the construction of an image processing apparatus according to an embodiment of the present invention.

FIG. 1 is a diagram showing the construction of an image processing apparatus according to an embodiment of the present invention.

In FIG. 1, reference numeral 1 denotes the main body of the image processing apparatus, which stores FlashPix files, decodes data read out of these FlashPix files and displays the data. Reference numeral 2 denotes an external storage device storing FlashPix files.

Figure 2:
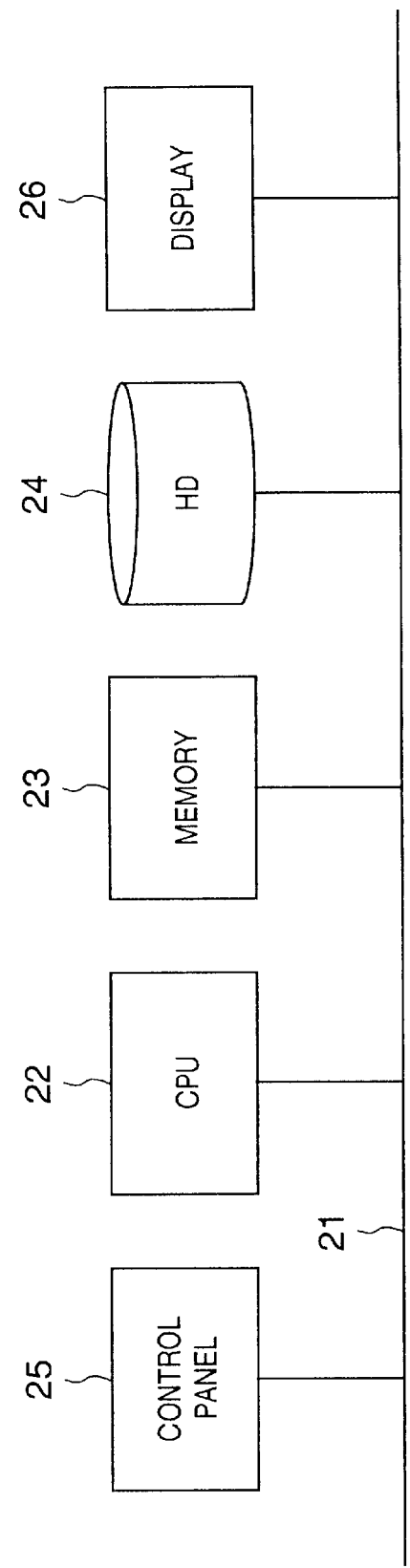
FIG. 2 is a block diagram showing the construction of the main body of the image processing apparatus according to this embodiment.

FIG. 2 is a block diagram showing the details of construction of the image processing apparatus 1 according to the embodiment illustrated in FIG. 1.

As shown in FIG. 2, the apparatus includes a bus 21 connecting the components, a CPU 22 for controlling the overall operation of the apparatus and executing the actual processing of a variety of types, and a memory 23 such as a RAM. The latter stores various programs such as an operating program (described later) shown in FIG. 8 and is used as a temporary work area when the CPU 22 operates. Further, a hard disk 24 stores programs and image data, and a control panel 25 has a keyboard and a mouse, etc., which allows the user to enter various commands when operating the apparatus of this embodiment. It should be noted that the external storage device 2 may share the hard disk 24 or may be separately provided. The apparatus further includes a display unit 26 such as a CRT or liquid crystal panel used to display messages for user as well as decoded image data.

A control program executed in this embodiment and indicated by a flowchart described later has been stored on a storage medium such as a floppy disk or CD-ROM and is installed on the hard disk 24 from this storage medium in advance. When this program is executed, it is loaded from the hard disk 24 to the memory 23, such as a RAM, and executed under the control of the CPU 22.

Figure 3:
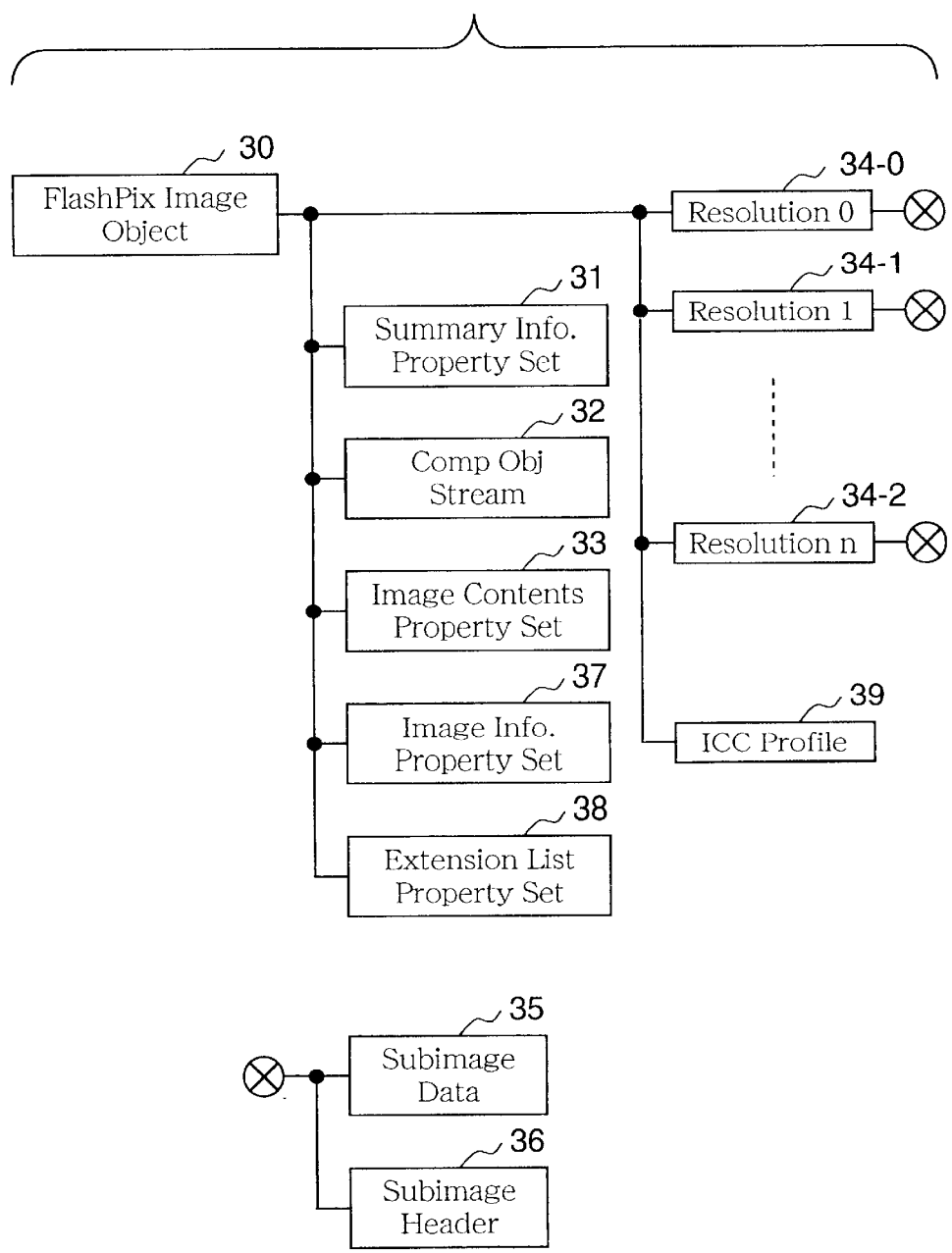
FIG. 3 is a diagram useful in describing the content of an ordinary FlashPix file.

FIG. 3 is a diagram useful in describing the structure of a FlashPix file in this embodiment.

Numerals 30 to 36 (inclusive of 34-0 to 34-2) in FIG. 3 denote essential items, and numerals 37 to 39 denote optional items. Image-related information such as image size and resolution is stored in an image-content property set 33. This information includes data relating to JPEG tables of JPEG-encoded data shown in FIGS. 4A and 4B. JPEG tables of up to 255 types can be declared and are managed by table numbers of 1 to 255. The maximum value of the table numbers is indicated by a "Maximum JPEG table index" ID, and each JPEG table is indicated by a "JPEG table" ID. FIG. 4B illustrates the general format of a JPEG header table indicated by a JPEG table ID. This table describes a marker (DQT) defining a quantization table, quantization table data, a marker (DHT) defining a Huffman table, and Huffman table data.

The structure shown in FIG. 3 will now be described in brief. A FlashPix Image Object 30 indicates one image, and a Summary Information Property Set 31 describes the title, subject, author, memo and thumbnail image, etc. of the file. A Comp Obj Stream 32 is information essential for a Microsoft structured file, and an Image-Content Property Set 33 stores information relating to number of layers, numbers of pixels in the horizontal and vertical directions of the image having the maximum resolution, color space used and compression scheme used, etc. This information is necessary in order to read out the image. An Image Info Property Set 37 is an area for storing information other than image information, and an Extension List Property Set 38 is used for information of an extension function not included in the FlashPix basic specifications. Subimage Data 35 indicates image data of each tile, and Subimage Header 36 stores an address of the image data of each tile. An ICC Profile 39 is an optional function describing a color conversion based upon the International Color Consortium.

FIG. 4A is a diagram useful in describing the properties of compressed (encoded) information. Here the name, ID code and property type have been set.

In FIG. 4A, a JPEG table has been specified by an ID code (0×03ii0001).

FIG. 4B is a diagram useful in describing the composition of a JPEG header table which defines quantization and Huffman tables. The JPEG header table describes the name, data length and value, etc., of each field. Here the JPEG quantization table and Huffman table are defined.

FIGS. 5A and 5B are diagrams useful in describing the format and fields of the header of each tile stored in the Subimage Header 36 of FIG. 3.

When the tile has been encoded in accordance with the JPEG standard, a value (0×2) indicating "JPEG" is set in a "Compression Type" field. A Compression Subtype field has the content shown in FIG. 5C. FIG. 5C illustrates format values of the Compression Subtype fields of tiles compressed by the JPEG standard. The above-mentioned identification number (JPEG Table Selector) of a JPEG table used by this tile is stored in this Compression Subtype field.

FIG. 6 is a diagram illustrating the format of JPEG-encoded data and values of each tile. This information is stored in Subimage Data 35 in FIG. 3.

The image size of this JPEG-encoded data is stored at the SOF (Start of Frame) marker code of this JPEG, although the image size of the JPEG-encoded data is fixed for all tiles and usually is X (size in the horizontal direction)=64, Y (size in the vertical direction)=64. Thus, there may be separate JPEG-encoded data for each tile.

Figure 7A:
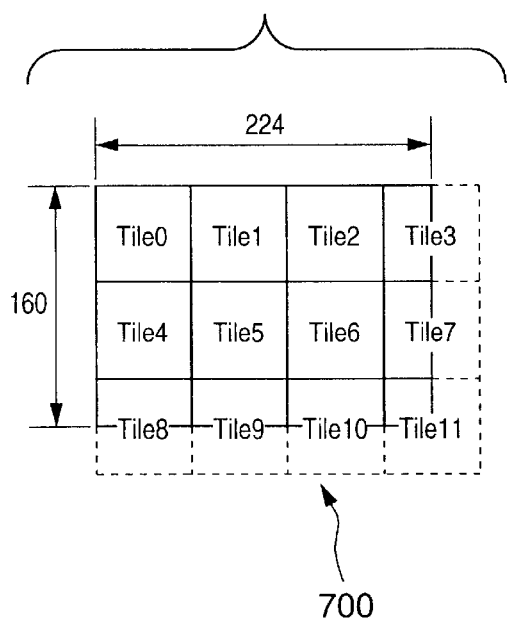
FIGS. 7A and 7B are diagrams useful in describing the result of dividing an original image into tiles and then encoding each tile.
Figure 7B:
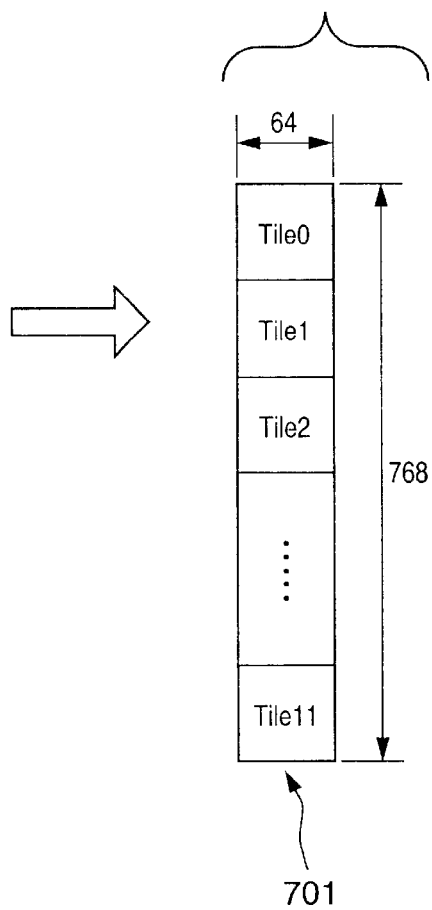

FIGS. 7A, 7B are conceptual views in which JPEG-encoded data, which has been stored in a FlashPix file as separate JPEG-encoded data for each tile, is merged with a single item of JPEG-encoded data.

In order to simplify the description, it will be assumed that the image size of an image 700 used is X size=244, Y size=160. In this case, the number of tiles obtained by dividing the image is 12, namely "Tile 0" to "Tile 11", as shown in FIG. 7A. In this embodiment, this will be described for a case where the encoded data is reconstructed as JPEG-encoded data of an image 701 of X size=64 and Y size=64×12=768, as shown in FIG. 7B, this encoded data is decoded by JPEG decoding processing and the original 224×160 image 700 is generated.

The details of processing will be described with reference to the flowchart of FIG. 8.

Figure 8:
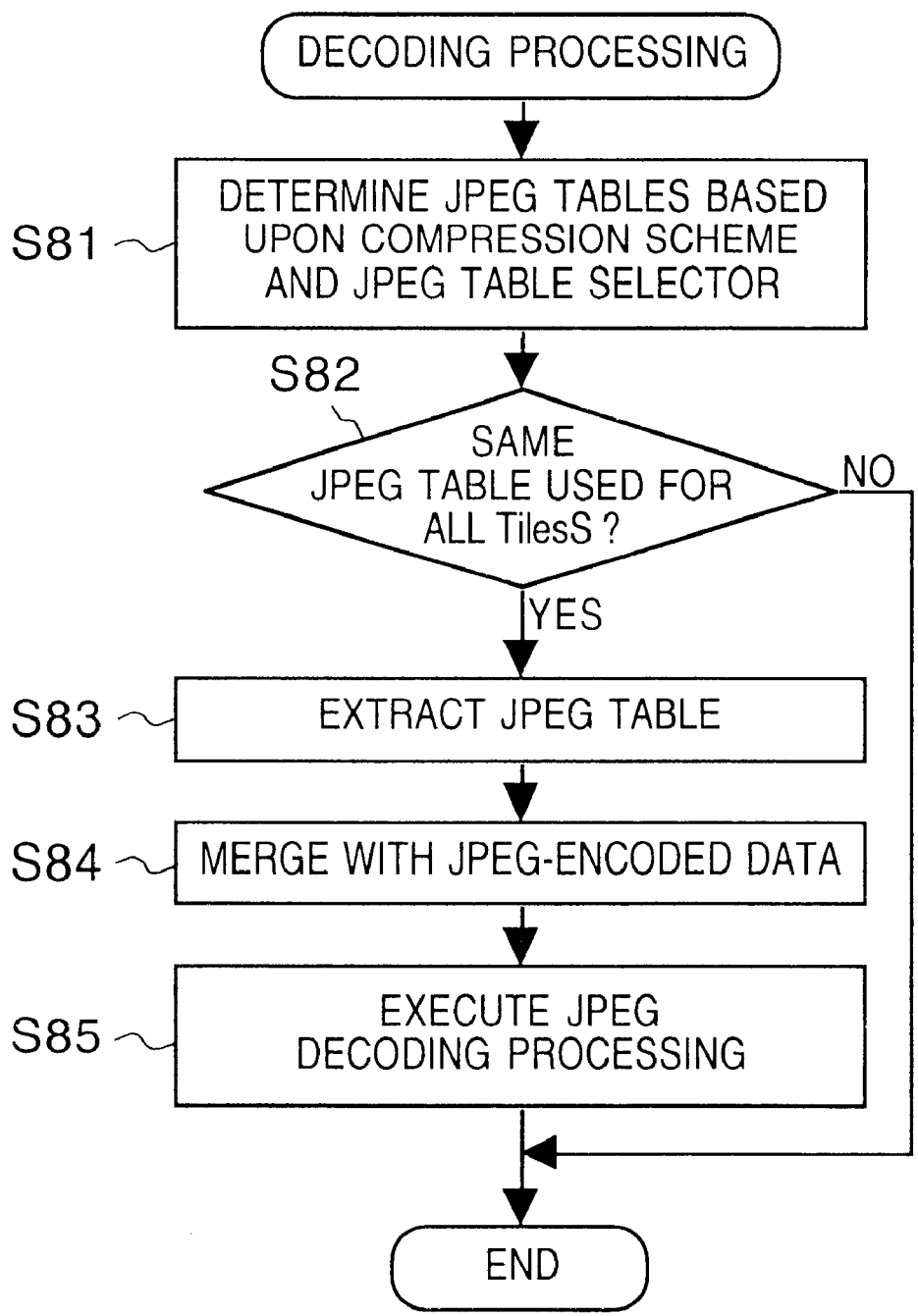
FIG. 8 is a flowchart illustrating decoding processing according to an embodiment of the present invention.

FIG. 8 is a flowchart illustrating overall encoding processing in the image processing apparatus of this embodiment. The program for executing this processing is stored in the memory 23 and is executed under the control of the CPU 22.

First, at step S81, on the basis of the compression schemes of all tiles and the content of the JPEG Table Selector, the types of JPEG tables that were used in the JPEG encoding of these tiles is investigated. Control then proceeds to step S82, at which it is determined whether all of the tiles were encoded according to a JPEG encoding scheme and the same JPEG table was used for all tiles. If it is found at step S82 that even one tile was encoded using a different JPEG table, the processing according to this embodiment cannot be executed, an error return code is sent back and processing is exited.

On the other hand, if it is determined at step S82 that the JPEG tables for all tiles are consistent, i.e., identical, control proceeds to step S83, at which the content of the JPEG Table Selector is used as a key to extract the JPEG table stored in the image-content property set 33 shown in FIG. 3. Control then proceeds to step S84, at which the JPEG table extracted at step S83 and the JPEG-encoded data of each tile are merged. Next, at step S85, the JPEG-encoded data reconstructed by the merging process is decoded to reproduce the image.

Figure 9:
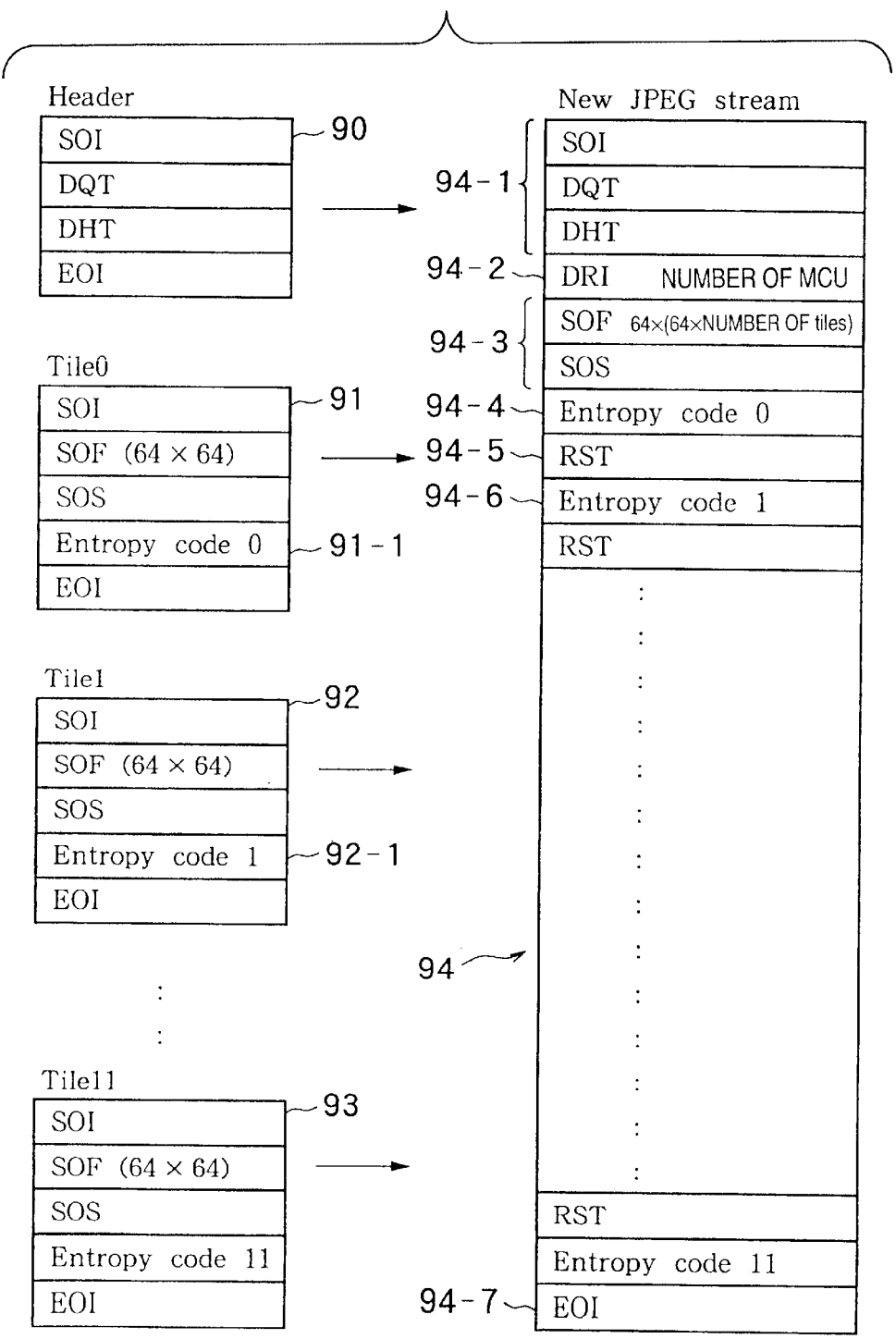
FIG. 9 is a diagram useful in describing a method of creating JPEG-encoded data according to a first embodiment of the present invention.

FIG. 9 is a diagram useful in describing the processing of step S84 in FIG. 8 for merging JPEG-encoded data.

The JPEG table that has been stored in the image-content property set 33 includes data 90 of a header table (see FIG. 4B) of the JPEG table, which is necessary for this processing, indicated by the JPEG Table Selector at step S81. A method of extracting this JPEG table is well known and need not be described. Numerals 91 to 93 denote JPEG-encoded data of respective tiles. This encoded data has been stored in Subimage Data 35. A method of extracting this encoded data also is well known and need not be described. Shown at 94 is the entirety of the JPEG-encoded data (referred to as "reconstructed code") reconstructed according to this embodiment. This will now be described in detail.

First, a portion 94-1 of the reconstructed code 94 is created based upon the header table 90 of the JPEG table. This may be accomplished merely by copying the header table 90 as is (excluding EOI code).

Next, a DRI (Define Restart Interval) marker code indicated at 94-2 is inserted. The marker code 94-2 is for so arranging it that the JPEG-encoded data is concluded for each tile. More specifically, the number of MCUs (Minimum Coded Units) set by the DRI marker code 94-2 is determined by the subsampling ratio. In a case where the subsampling ratio "Chroma subsampling" in FIG. 5C is, e.g., "0×22", the number of MCUs of one tile is "16" (a hexadecimal code) and "16" is set as the number of MCUs at the DRI marker code 94-2. The MCU is composed of two bytes and specifies the intervals at which the RST is inserted. The RST marker code is inserted into compressed data only when the value of the MCU is other than "0".

Next, an SOF (Start of Field) marker and an SOS (Start of Scan) marker are created from the JPEG-encoded data 91 of Tile 0. In processing of the SOF marker code, the Y size is made [64×number of tiles (i.e., 12)]. That is, since the number of tiles is 12 in this embodiment, the Y size is made 64×12=768. The SOS need only be copied as is. Next, an entropy code 91-1 of the JPEG-encoded data 91 of Tile 0 is copied to 94-4 of the reconstructed code 94. This is followed by inserting a restart (RST) marker code at a position in the reconstructed code 94 indicated at 94-5.

Processing of the JPEG-encoded data 92 of Tile 1 will be described next. Here an entropy code 92-1 of the encoded data 92 is copied to 94-6 in the reconstructed code 94, then the RST marker code is inserted. This processing is repeated up to encoded data .93 of the final tile (Tile 11). An EIO marker code 94-7 is inserted at the end and processing for creating the reconstructed code 94 is terminated.

Figure 10:
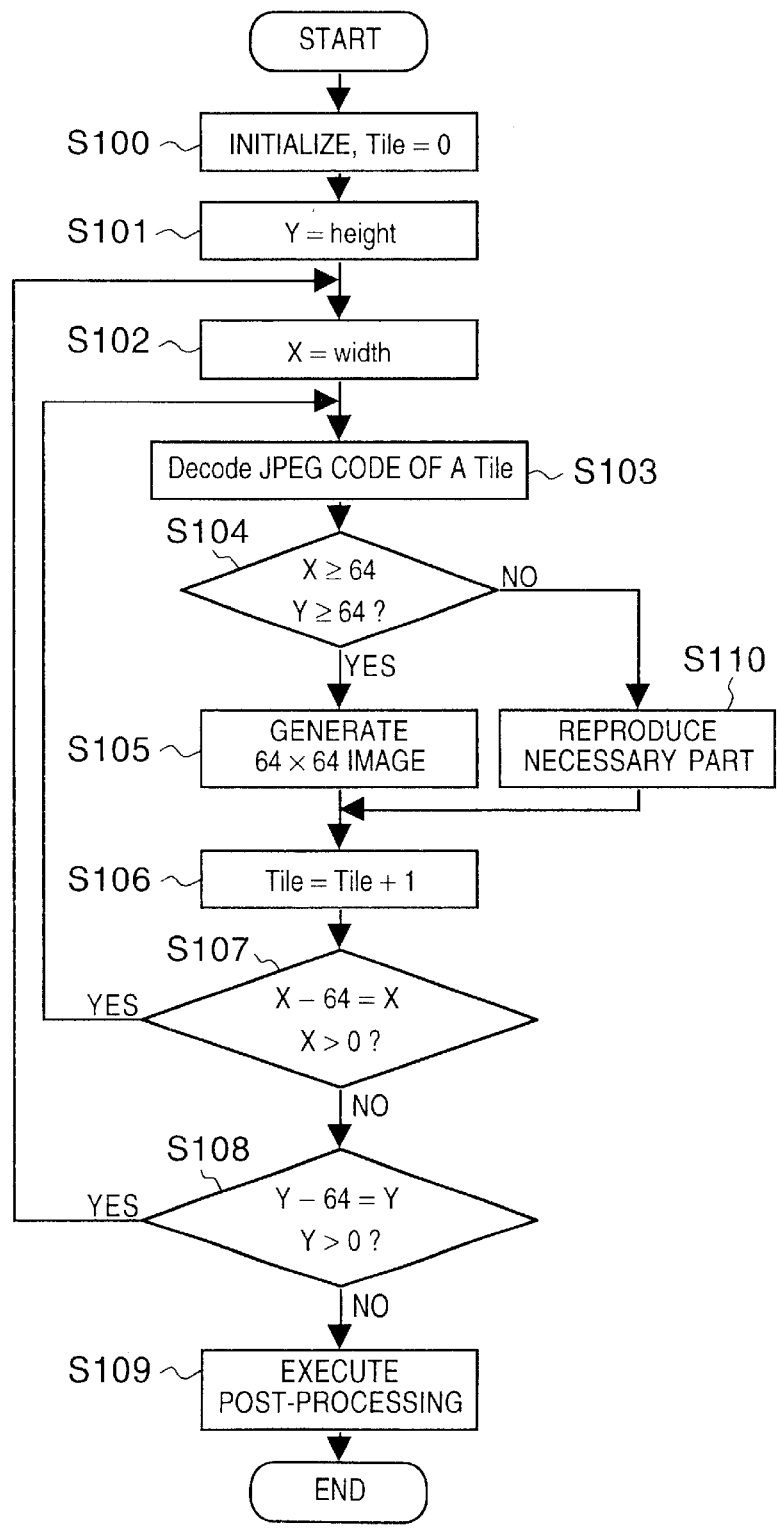
FIG. 10 is a flowchart illustrating decoding processing according to the first embodiment of the present invention.

FIG. 10 is a flowchart illustrating processing for decoding encoded data that has been created in the manner shown in FIG. 9. The program for executing this processing has been stored in the memory 23 and the program is run under the control of the CPU 22.

First, initialization for JPEG decoding is carried out at step S100. Here a pointer (Tile) which indicates the tile to be decoded is set to "0" (Tile=0). Next, at step S101, the vertical (Y direction) size of the original image (e.g., image 700 in FIG. 7A) is set, control then proceeds to step S102 and the horizontal (X direction) size of the original image 700 is set. In this embodiment, the size of the original image to be decoded is Y size=160,xsize=224, as mentioned earlier.

Next, control proceeds to step S103, at which JPEG decoding processing of one tile is executed. This is followed by step S104, at which it is determined whether the X and Y sizes of the image are both equal to or greater than 64. If the answer is "YES", then control proceeds to step S105, at which the 64×64 image data decoded and reproduced at step S103 is written to the tile of the image indicated by the pointer Tile.

If it is found at step S104 that at least one of the X and Y sizes is less than 64, control proceeds to step S110, at which the necessary portion is cut from the 64×64 image data decoded and reproduced at step S103 and only the cut valid image data is written to the image tile indicated by the pointer Tile. The processing of step S110 is applied to tiles at the edge of the image when the size of the overall image is not a whole-number multiple of 64. For instance, in the example of image 700 shown in FIG. 7A, this applies to Tile 3 and Tiles 7 to 11.

Next, control proceeds to step S106, at which the pointer Tile is incremented by +1 to designate the next tile, and then to step S107. Here, since the processing regarding the first tile is finished, 64 is subtracted from the X size and it is determined whether the result is greater than zero. This is to determine whether the tile processed previously was a tile on the right edge of the image. If the result of the subtraction is greater than zero, this means that the tile was not a tile on the right edge and, hence, control returns to step S103 and processing is applied to the next tile. On the other hand, if it is found at step S107 that the value of the X size is zero or less, this means processing up to, e.g., Tile 3 in FIG. 7A is finished. Accordingly, control proceeds to step S108, at which 64 is subtracted from the Y size and it is determined whether the result is greater than zero, i.e., whether the processing of the final tile (Tile 11) has been completed. If the result is greater than zero, control returns to step S102, the X size is restored to the initial value of 224 and the above-described processing is repeated. On the other hand, if it is found at step S108 that the value of the Y size is zero or less, this means that the processing of all tiles of the image is finished. According, control proceeds to step S109, at which post-processing of JPEG decoding processing is executed. The decoding processing of all tiles is then exited. Thus, image data can be decoded and reproduced.

Thus, in accordance with the first embodiment, after the encoded data of each tile is merged, this encoded data is subjected to decoding processing. As a result, processing such as table initialization while referring to headers for each and every tile is no longer required. This makes it possible to shorten the time needed for decoding.

Second Embodiment

According to the first embodiment, JPEG encoding processing was applied to all tiles of an original image. The second embodiment, however, takes into consideration a case where an image includes tiles that have been subjected to another encoding scheme, e.g., tiles involving single-color compression, or tiles of uncompressed data.

Figure 11:
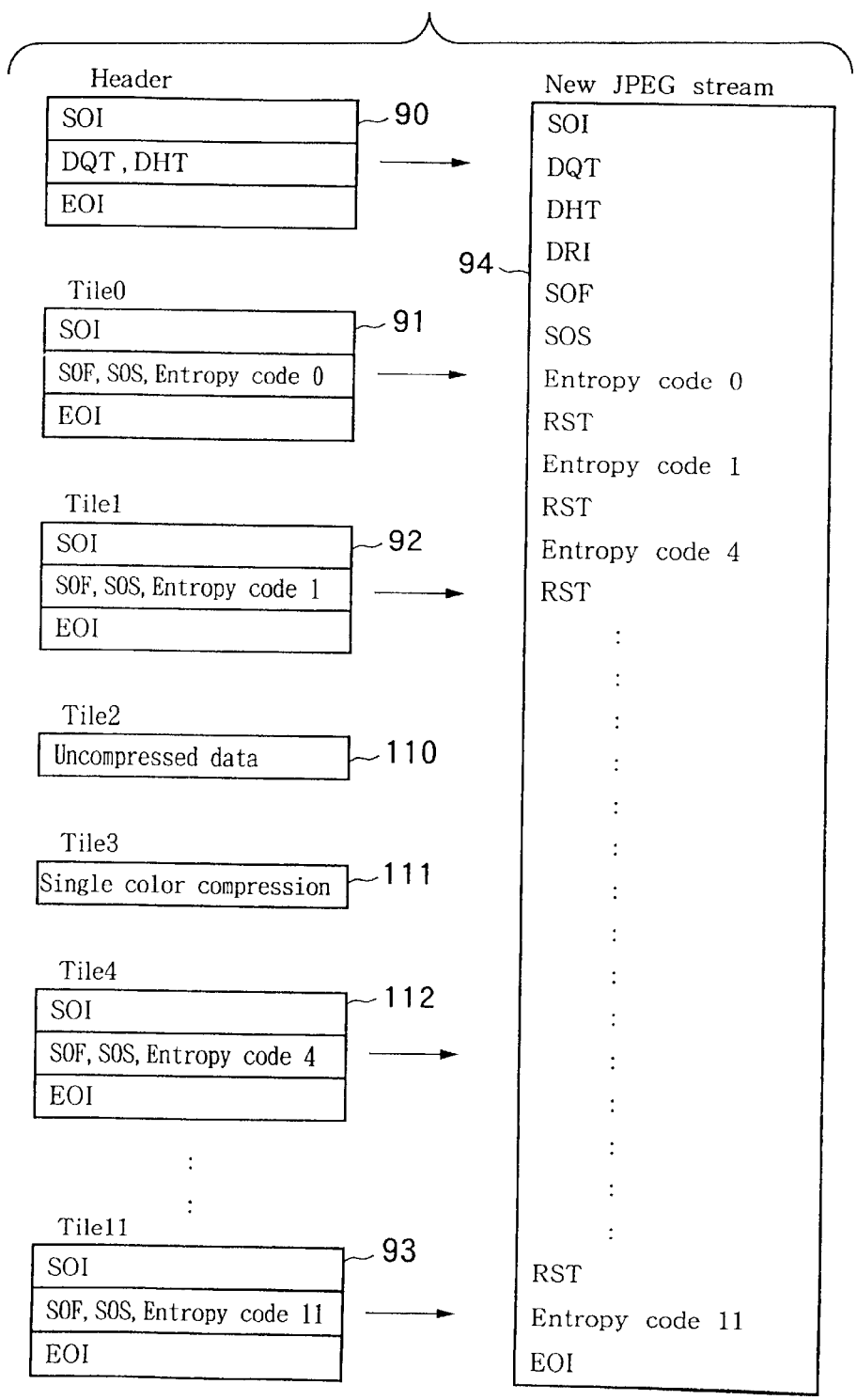
FIG. 11 is a diagram useful in describing a method of creating JPEG-encoded data according to a second embodiment of the present invention.

FIG. 11 is a diagram showing an example of the structure of such encoded data. It should be noted that portions in FIG. 11 identical with those of the first embodiment (FIG. 9) are designated by like reference numerals and are not described again.

If FIGS. 11 and 9 are compared, it will be evident that Tile 2 and Tile 3 in FIG. 11 represent data that has not undergone JPEG encoding. Such encoded data of files that have not been subjected to JPEG encoding do not participate in the creation of the reconstructed code 94 that is newly generated.

This embodiment differs from the first embodiment in the method of calculating the Y size included in the SOF marker code at 94-3 of the reconstructed code 94 (FIG. 9). Specifically, in the case of the second embodiment, the Y size is calculated as follows:

Y size=64×(number of tiles subjected to JPEG encoding).

For example, assume that the number of tiles that have not undergone JPEG encoding is two, as in the example of FIG. 11. Since 12 (total number of tiles)−2 =10, the Y size is found as 64×10=640.

Processing for decoding encoded data having a certain resolution will now be described.

Figure 12:
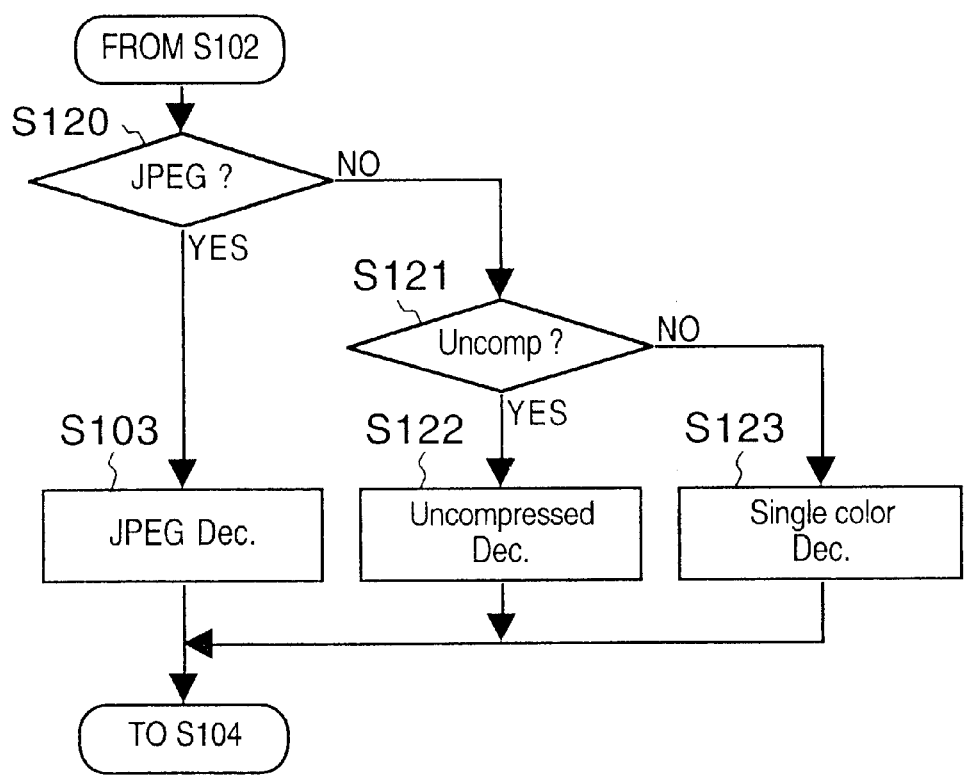
FIG. 12 is a flowchart illustrating decoding processing according to the second embodiment of the present invention.

FIG. 12 is a flowchart illustrating processing according to the second embodiment of the present invention. This flowchart shows processing inserted between steps S102 and S104 in the flowchart of the first embodiment (FIG. 10).

First, it is determined at step S120 whether a tile to undergo processing from this point onward has been subjected to JPEG encoding. If the answer is "YES", control proceeds to step S103 and JPEG decoding processing is applied. This is similar to the case of the first embodiment described above.

If it is found at step S120 that the tile has not been subjected to JPEG encoding, on the other hand, control proceeds to step S121, at which it is determined whether this tile is a tile of uncompressed (i.e., uncoded) data. If the answer is "YES", control proceeds to step S122, at which processing is applied to the uncompressed data.

If it is found at step S121 that the tile is not a tile of uncompressed data, on the other hand, single-color decoding processing is executed at step S123.

As a result of this processing, even if tile data is tile data that has been subjected to encoding by an encoding scheme other than JPEG encoding or is tile data that has not been compressed, decoding processing conforming to this encoding scheme or other conforming processing is executed, thereby making it possible to perform decoding processing at high speed without adversely affecting the decoding processing of JPEG-encoded data.

In the first and second embodiments described above, encoded data that has been newly reconstructed is created and only the number of tiles of interest in this reconstructed data are subsequently subjected to decoding processing. However, that it is possible to decode tiles while new encoded data is created tile by tile is obvious. Methods of creating new encoded data or the processing flowcharts are not limited to those described.

Third Embodiment

The first and second embodiments have been described in regard to a case where all tiles constituting image data of a certain resolution employ one type of quantization table and one type of Huffman table. The third embodiment, however, relates to a case where use is made tables of a plurality of types.

FIG. 13 is a flowchart useful in describing processing according to a third embodiment of the present invention.

First, at step S130, the compression scheme and JPEG table number, etc., of the tile to undergo processing from this point onward are identified. Control then proceeds to step S131, at which it is determined whether encoding is JPEG encoding or not. In case of JPEG encoding, control proceeds to step S132, at which the number of the table used by the JPEG-encoded data is discriminated and it is determined whether this table is a new table that has not been used thus far.

If the table is a new table to be used for the first time, control proceeds to step S133. Here, in a manner similar to that of step S83 in FIG. 8, the content of the JPEG Table Selector is used as a key to extract the JPEG table data stored in the image-content property set 33. Control then proceeds to step S134, at which the Y size of the image data stored in the SOF marker code in the JPEG-encoded data is made zero. This is followed by step S135, at which the entropy code is copied. Thus, a reconstructed code with which the encoded data has been merged is created in a manner similar to that of the first and second embodiments. The method of merging the JPEG-encoded data in this case is basically the same as that of the above embodiments.

If it is determined at step S132 that the table is not a new table, control proceeds to step S135. Here the encoded data of the current file is merged with the encoded data of the applicable table to create a reconstructed code.

Control then proceeds to step S136, at which each tile is subjected to decoding processing. The flowchart which illustrates this decoding processing is the flowchart described in the first embodiment. That is, the decoding processing is the same as that shown in FIG. 12. Control then proceeds to step S137, at which it is determined whether all tiles constituting the resolution to undergo decoding processing have been subjected to the above-described processing. If the decision rendered is "NO", control returns to step S130 and the above-described processing is repeated.

Finally, the number of tiles is counted for each JPEG table used and the Y size of this encoded data is inserted by a "Define number of lines" DNL marker code at the end of the applicable JPEG-encoded data. As a result, the JPEG-encoded data created has a code format that is in accordance with the JPEG standard.

By virtue of the processing described above, in accordance with the illustrated embodiment, JPEG-encoded data is created only in an amount commensurate with the number of employed quantization and Huffman tables by taking into consideration the sameness, from one tile to the next, of the tables applied to each of the tiles, and this JPEG-encoded data is decoded, thereby making it possible to execute decoding processing at high speed.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments, and the storage medium storing the program codes constitutes the invention.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

It should be noted that although the foregoing embodiments have been described independently of one another, this does not impose a limitation upon the present invention and it goes without saying that the embodiments may be implemented independently or in suitable combinations.

In accordance with the embodiments as described above, when all tiles of image data of a certain resolution, which image data has been stored in the FlashPix file format, are subjected to encoding processing in accordance with the JPEG standard and quantization and Huffman tables are stored in areas separate from those of the tile data, a reconstructed code is generated in which the JPEG-encoded data, which is independent from one tile to the next, is converted to JPEG-encoded data the number of items of which corresponds to the number of tables used, so as to obtain the following:

X size=X size (i.e., 64) of tile;

Y size=Y size of tile×number of tiles (i.e., 64×number of tiles); and restart at each tile.

By applying JPEG decoding processing to this reconstructed file, decoding can be carried out by an ordinary JPEG decoding processor.

Furthermore, by effecting the conversion to JPEG-encoded data the number of items of which corresponds to the number of tables, such as quantization and Huffman tables, used by the JPEG-encoded data of all tiles and not just the number of files that are to be decoded, it is no longer necessary to initiate JPEG decoding processing, i.e., to initialize tables, afresh for each and every tile. This makes high-speed decoding processing possible.

Further, decoding processing can be executed at high speed by the same processing algorithm even if an image contains tiles that have been encoded using different encoding schemes.

The present invention is not limited to the above embodiments and various changes and modifications can be made within the spirit and scope of the present invention. Therefore, to apprise the public of the scope of the present invention, the following claims are made.

What is claimed is:

1. A decoding apparatus for decoding encoded image data that has been obtained by dividing image data into a plurality of tiles and encoding the image data on a tile-by-tile basis, comprising:

determination means for determining encoding tables that were used in the encoding of each of the plurality of tiles;

reconstruction means for reconstructing, as a single item of encoded data, the encoded data of a plurality of tiles for which the same encoding table was used; and decoding means for decoding the encoded data reconstructed by the reconstruction means.

2. A decoding apparatus for decoding encoded image data that has been obtained by dividing image data into a plurality of tiles and encoding the image data on a tile-by-tile basis in accordance with the JPEG standard, comprising:

determination means for determining encoding tables that were used in the encoding of each of the plurality of tiles;

reconstruction means for reconstructing the encoded data of each of the plurality of tiles based upon sameness of the encoding tables determined by the determination means, upon inserting a control code at the boundaries of the encoded data of respective ones of the plurality of tiles; and decoding means for decoding the encoded data reconstructed by the reconstruction means.

3. A decoding apparatus for decoding encoded image data that has been obtained by dividing image data into a plurality of tiles and encoding the image data on a tile-by-tile basis in accordance with the JPEG standard, comprising:

determination means for determining encoding tables that were used in the encoding of each of the plurality of tiles;

reconstruction means for reconstructing the encoded data of each of the plurality of tiles based upon sameness of the encoding tables determined by the determination means, extracting an entropy code of the encoded data of respective ones of the plurality of tiles and inserting a restart code at the boundaries of the codes corresponding to the respective tiles; and decoding means for decoding the encoded data reconstructed by the reconstruction means.

4. A decoding apparatus for decoding encoded image data that has been obtained by dividing image data into a plurality of tiles and encoding the image data on a tile-by-tile basis in accordance with the JPEG standard, comprising:

determination means for determining encoding tables that were used in the encoding of each of the plurality of tiles;

reconstruction means for reconstructing the encoded data of each of the plurality of tiles based upon sameness of the encoding tables determined by the determination means except for tiles that have not been encoded in accordance with the JPEG standard; and decoding means for decoding the encoded data reconstructed by the reconstruction means.

5. A decoding method for decoding encoded image data that has been obtained by dividing image data into a plurality of tiles and encoding the image data on a tile-by-tile basis, comprising the steps of:

determining encoding tables that were used in the encoding of each of the plurality of tiles;

reconstructing, as a single item of encoded data, the encoded data of the plurality of tiles for which the same encoding table determined in said determining step was used; and decoding the encoded data reconstructed at the reconstructing step.

6. A decoding method for decoding encoded image data that has been obtained by dividing image data into a plurality of tiles and encoding the image data on a tile-by-tile basis, comprising the steps of:

determining encoding tables that were used in the encoding of each of the plurality of tiles;

reconstructing the encoded data of each of the plurality of tiles based upon sameness of the encoding tables determined at said determining step, and reconstructing the encoded data upon inserting a control code at the boundaries of the encoded data of respective ones of the plurality of tiles; and decoding the encoded data reconstructed in said reconstructing step.

7. A decoding method for decoding encoded image data that has been obtained by dividing image data into a plurality of tiles and encoding the image data on a tile-by-tile basis in accordance with the JPEG standard, comprising the steps of:

determining encoding tables that were used in the encoding of each of the plurality of tiles;

reconstructing the encoded data of each of the plurality of tiles based upon sameness of the encoding tables determined at said determining step, extracting an entropy code of the encoded data of respective ones of the plurality of tiles and inserting a restart code at the boundaries of the codes corresponding to the respective tiles; and decoding the encoded data reconstructed in said reconstructing step.

8. A decoding method for decoding encoded image data that has been obtained by dividing image data into a plurality of tiles and encoding the image data on a tile-by-tile basis in accordance with the JPEG standard, comprising the steps of:

determining encoding tables that were used in the encoding of each of the plurality of tiles;

reconstructing the encoded data of each of the plurality of tiles based upon sameness of the encoding tables determined at said determining step, except for tiles that have not been encoded in accordance with the JPEG standard; and decoding the encoded data reconstructed in said reconstructing step.

9. A computer-readable storage medium storing a program for executing a decoding method for decoding encoded image data that has been obtained by dividing image data into a plurality of tiles and encoding the image data on a tile-by-tile basis, comprising:

a determination-step module adapted to determine encoding tables that were used in the encoding of each of the plurality of tiles;

a reconstruction-step module adapted to reconstruct, as a single item of encoded data, the encoded data of the plurality of tiles for which the same encoding table determined by the determination-step module was used; and a decoding-step module adapted to decode the encoded data reconstructed by the reconstruction-step module.

10. A computer-readable storage medium storing a program for executing a decoding method for decoding encoded image data that has been obtained by dividing image data into a plurality of tiles and encoding the image data on a tile-by-tile basis, comprising:

a determination-step module adapted to determine encoding tables that were used in the encoding of each of the plurality of tiles;

a reconstruction-step module adapted to reconstruct the encoded data of each of the plurality of tiles based upon sameness of the encoding tables determined by the determination-step module and reconstruct the encoded data upon inserting a control code at the boundaries of the encoded data of respective ones of the plurality of tiles; and a decoding-step module adapted to decode the encoded data reconstructed by the reconstruction-step module.

* * * * *

UNITED STATES PATENT AND TRADEMARK OFFICE
CERTIFICATE OF CORRECTION

| | |
|---|---|
| PATENT NO. | : 6,668,086 B1 |
| APPLICATION NO. | : 09/570819 |
| DATED | : December 23, 2003 |
| INVENTOR(S) | : Miyuki Enokida |

It is certified that error appears in the above-identified patent and that said Letters Patent is hereby corrected as shown below:

COLUMN 6

Line 43, "encoded data .93," should read --encoded data 93--; and
  Line 58, "Y size=160, xsize=224" should read --Y size = 160, X size = 224--.

Signed and Sealed this

Seventeenth Day of July, 2007

JON W. DUDAS
*Director of the United States Patent and Trademark Office*